United States Patent [19]

Miyagishima et al.

[11] 4,417,411
[45] Nov. 29, 1983

[54] INFORMATION DISPLAY DEVICE

[75] Inventors: Naoki Miyagishima, Yokohama; Shigeru Nakagawa, Fujisawa, both of Japan

[73] Assignee: Marui Industry Co., Ltd., Japan

[21] Appl. No.: 324,634

[22] Filed: Nov. 24, 1981

[30] Foreign Application Priority Data

Nov. 29, 1980 [JP] Japan .................. 55-167380

[51] Int. Cl.³ .................................. G09F 13/00
[52] U.S. Cl. ................................ 40/443; 40/219; 40/615
[58] Field of Search ............... 40/443, 219, 564, 442, 40/615

[56] References Cited

U.S. PATENT DOCUMENTS

| | | | |
|---|---|---|---|
| 1,786,033 | 12/1930 | Smith | 40/219 |
| 2,159,328 | 5/1939 | Horinstein | 40/219 |
| 2,496,488 | 2/1950 | Ohman | 40/219 X |
| 3,018,107 | 1/1962 | Erickson | 40/219 |
| 3,132,476 | 10/1938 | Holm | 40/219 |

Primary Examiner—Robert Peshock
Assistant Examiner—Wenceslao J. Contreras
Attorney, Agent, or Firm—Wenderoth, Lind & Ponack

[57] ABSTRACT

This invention discloses an information display device including a front plate and information visualizing means provided behind the front plate and adapted to make information consisting of characters, patters and/or others appear on the front surface of the plate by the light emitted from the visualizing means and passing through the plate, the device being characterized in that the front plate is made from transparent material such as transparent synthetic resins, glass or the like and is provided with metal coating on the front surface or the back surface of the front plate. The thickness of the metal coating is such that the metal coating permits the light emitted from the visualizing means to pass through it to make the information emerge on the front surface of the front plate and substantially prevents light the intensity of which is less than the former light from passing through the coating.

8 Claims, 8 Drawing Figures

INFORMATION DISPLAY DEVICE

BACKGROUND OF THE INVENTION

This invention relates to an information display device used in dash-boards of autos, electronic digital clocks, electronic calculators or others.

In the past, as seen in dash-boards of autos, electronic clocks, electronic calculators, there are known information display devices which have a dark semitransparent front plate made from acrylic resin and information visualizing means provided behind the front plate and adapted to make information consisting of characters, patterns or the like appear on the front surface of the front plate by light emitted from the visualizing means and passing through the plate.

However, such display devices have a defect in that the dark color of the front plate is quite different from that of the frame surrounding the front plate, so that the plate sometimes becomes an obstacle to effect decorative design of the dash-boards, clocks, calculators and so forth.

SUMMARY OF THE INVENTION

Accordingly, an object of this invention is to provide an information display device without such defects.

Another object of this invention is to provide an information display device in which the display area is usually seen just as a metallic wall and information suddenly appears on the area upon turning on light means provided inside of the display device to thereby give a surprise to viewers and increase as the attention-getting value of the display device.

In accordance with the invention, the front plate is made from transparent material such as transparent synthetic resins, glass or the like and is provided with metal coating on the front surface or the back surface of the front plate. The thickness of the metal coating is such that the metal coating permits the light emitted from the visualizing means to pass through it to make information appear on the front surface of the front plate and substantially prevents light, the intensity of which is less than the former light from passing through the metal coating. In a preferred embodiment, the thickness is about 300 Å. It is generally required that the thickness of the metal coating be within the range 200–300 Å.

BRIEF DESCRIPTION OF THE DRAWINGS

The foregoing and other objects, features and advantages of the invention will be apparent from the following more particularized description of preferred embodiments of the invention, as illustrated in the accompanying drawings, in which.

DETAILED DESCRIPTION OF THE PREFERRED EMBODIMENTS

Figure 1A:
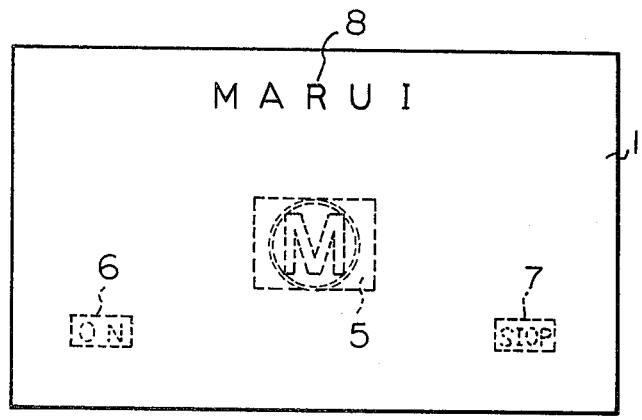
FIG. 1a is a front view of an information display device in accordance with a first embodiment in which information consisting of characters provided inside of the device is shown by dotted lines.
Figure 1B:
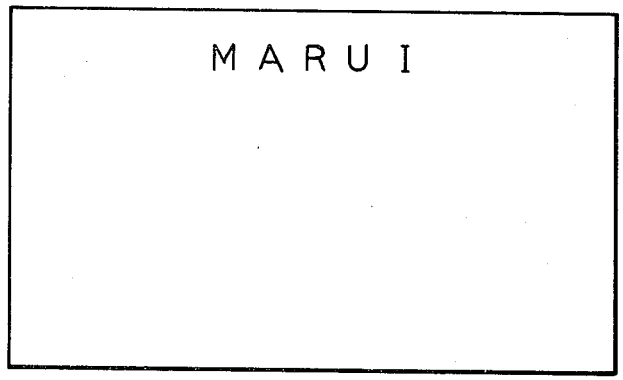
FIG. 1b is a front view of the display device of FIG. 1a which is not operated.
Figure 1C:
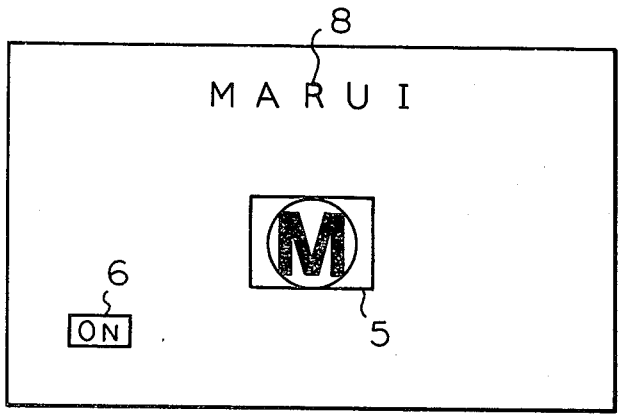
FIG. 1c is a front view of an information display device of FIG. 1a which is in operation.
Figure 2:
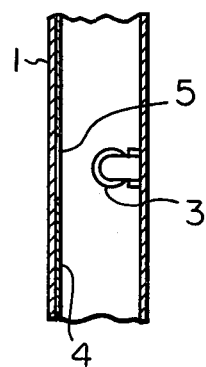
FIG. 2 is a cross sectional view of a portion of the device shown in FIG. 1.
Figure 5:
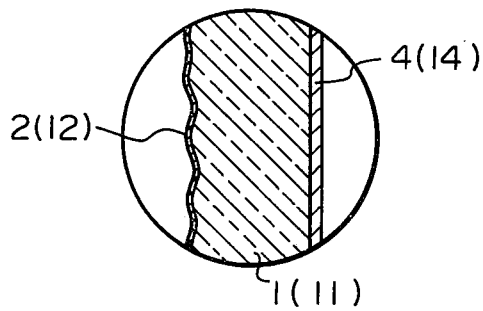
FIG. 5 is an exaggerated sectional view of a portion of the front plate of the devices shown in FIGS. 1 and 3; and, FIG. 6 is an exaggerated sectional view of a portion of another embodiment of a front plate in accordance with the present invention.

With reference to FIGS. 1, 2 and 5, there is shown an information display device in accordance with the first embodiment of the invention which is adapted to be used in an operation indicating portion provided on a front side of an air conditioner. Reference 1 shows a front plate of the device made from transparent acrylic resin. The front or outer surface of the front plate is subjected to scotch brushing surface processing to make the surface rough (FIG. 5). The surface processing may be also effected by satin finish method or graining finish method. The height of projections or convex portions of the rough surface is less than $25\mu$. If the height is greater than the above value, the information which emerges on the surface of the plate is difficult to read. A flatted and scotch brushed metallic layer 2 is formed on the rough surface by first providing an under coating of organic based paint on the rough surface, then providing a metal coating of chrome alloy by vacuum evaporation, and providing a top protective coating of a transparent material containing flatting agent therein on the metal coating. The thickness of the metal coating is about 300 Å. The thickness may be within a range of from about 200 Å to about 300 Å. If the thickness is more than the above values, it becomes difficult for the light emitted from an information visualizing means, which will be explained hereinafter, to pass the coating and, if the thickness is less than the above values, the inside of the device becomes visible from the outside. Any metal—copper, tin, etc. may be used to form the metal coating in accordance with the color desired for the outer surface of the front plate. Further, if desired, the surface of the top coating may be lustrous. Provision of the top coating on the metal coating provides decorative effect and strength thereto. The metal coating may be effected by sputtering method or hot stamp method as well as vacuum evaporation method.

Behind the front plate, there is provided an information visualizing means. In this embodiment, the means includes three lamps 3 (only one is shown in FIG. 2) provided on the back plate of the device and information consisting of characters printed on the inner surface of the front plate. That is, the inner surface of the front plate is subjected to silk screen printing so that the inner surface of the front plate is provided with a masking layer 4 except for the portions 5,6 and 7 in which mark "M", characters or information "ON" and "STOP" are printed. The lamps 3 are provided rearward of corresponding no-masked portions 5, 6 and 7 to lighten "M", "ON" and "STOP", respectively. In this embodiment, the lamps 3 are fluorescent lights of 100 V, 6 W. In the drawings, reference 8 designates a company name printed on the metal layer 2 and the mark "M" is the mark of the company.

When the air conditioner is not operated, the surface of the information display device looks like a metallic surface and only the company name 8 can be seen. If the air conditioner is turned on, the lamps 3 corresponding to mark "M" and information "ON" are turned on and the mark and the information emerge on the outer surface of the front plate as shown in FIG. 1c. During the operation, if any trouble occurs and the operation of the air conditioner is stopped, the lamp corresponding to "ON" is turned off and the lamp corresponding to "STOP" is turned on; thus "ON" disappears and "STOP" appears on the outer surface of the front plate. Preferably, the portions 6 and 7 bearing the information "ON" and "STOP" are colored blue and red, respectively to attract the user's attention.

In the preferred embodiment, fluorescent lights of 100 V, 6 W are employed as the light sources of the information visualizing means, so that the luminous intensity on the inner side of the front plate is about 300 luxes and the luminous intensity on the outer surface of the front plate based on the light transmitted through the front plate is about 200 luxes, whereby the information visualized on the front surface of the front plate can be seen clearly without being influenced by the rough and flatted surface of the front plate.

In the above described embodiment, information is printed on the inner surface of the front plate; however it can be provided on the front surface of the front plate. In such case, the information is provided on the front surface prior to the provision of the metallic layer 2.

A second embodiment of the invention will be explained with reference to FIGS. 3, 4 and 5. The information display device of this embodiment is a time display device of electric digital clock. A front plate 11 of 30 this device is substantially the same as that of the first embodiment and is made from transparent member 11, and a flatted and rough metallic layer 12 is provided on the rough front surface of the plate. An information visualizing means of this embodiment differs from that of the first embodiment and comprises a liquid crystal display member 15 attached to the inner surface of the front plate by opposite side adhesive tapes 16 and a lamp 18 provided on a back plate 19. The inner surface of the front plate is provided with masking coating 14 thereon except for the display portion 13 corresponding to the liquid crystal display member 15. The liquid crystal display member 15 is connected to LSI (large scaled integrated circuit) of the clock so that it displays the time.

Figure 3:
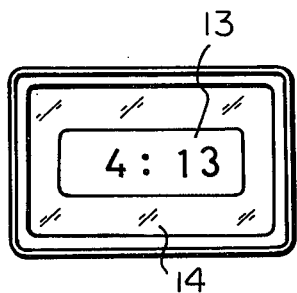
FIG. 3 is a front view of an information display device in accordance with a second embodiment which is in operation.
Figure 4:
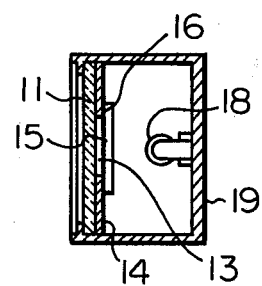
FIG. 4 is a cross sectional view of the device of FIG. 3.

The metal coating in the layer 12 of the embodiment is also of thickness of 200–300 Å, so that when the lamp 18 is not turned on, the digits appearing on the liquid crystal member 15 representing time are veiled by the metallic layer 12 and, when the lamp is turned on, the digits emerge on the front surface of the front plate as shown in FIG. 3. The liquid crystal display member may be replaced by a light transparent type display member such as an electrochromic display member or a self light emitting member such as LED and fluorescent display member. When a self light emitting member is used, the lamp 18 is of course not required.

Figure 6:
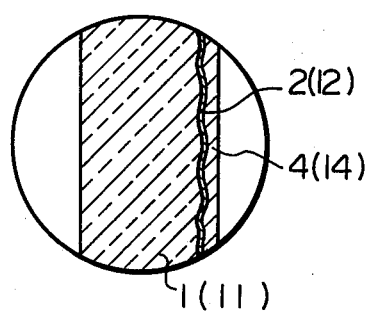

Though in the above described embodiments, the metallic layer is provided on the front surface of the front plate, the layer may, as shown in FIG. 6, be provided on the back or inner surface of the front plate 1(11) and the masking layer 4(14), information to be visualized or the like which constitute the information visualizing means may be provided on or behind the back surface of the metallic layer. In such case, the metallic layer is formed by first providing an under coating of organic based transparent paint on the back surface of the front plate, then providing a metal coating and providing a protective coating of a transparent material on the metal coating. As in the above stated embodiments, in this embodiment, it is preferred that the front surface of the metallic layer does not glisten very much when it is viewed through the front. So, the undercoating contains a flatting agent therein or the back surface of the front plate is subjected to scotch brushing method, satin finish method or graning finish method to make the surface rough as shown in FIG. 6. In the latter way, the height of projections or convex portions of the rough surface is made to be less than 25μ. The metal coating may be made from any of various metals such as chrome alloy, copper, tin or the like through vacuum evaporation method, sputtering method or hot stamp method.

What is claimed is:
1. An information display device comprising:
(1) a plate made of a transparent material and having the following layers on the front surface thereof:
   (a) an undercoating of transparent organic based paint,
   (b) a metal coating on said undercoating and
   (c) a transparent protective coating on said metal coating, said protective coating containing a flatting agent,
(2) an image provided behind said plate, and
(3) a light source behind said image, said light source being strong enough to make said image visible when viewed from the front of said plate when said light is activated, and invisible from the front of said plate when said light is not activated.

2. The information display device according to claim 1 wherein the thickness of the metal coating is 200–300 Å.

3. An information display device comprising:
(1) a plate made of a transparent material and having the following layers on the rear surface thereof:
   (a) an undercoating of transparent organic based paint, said undercoating containing a flatting agent,
   (b) a metal coating on said undercoating and
   (c) a transparent protective coating on said metal coating,
(2) an image provided behind said protective coating, and
(3) a light source behind said image, said light source being strong enough to make said image visible when viewed from the front of said plate when said light is activated, and visible from the front of said plate when said light is not activated.

4. The information display device according to claim 3 wherein the thickness of the metal coating is 200–300 Å.

5. An information display device comprising:
(1) a plate made of a transparent material and having a roughened surface with convex portions of 25 microns or less on the front surface thereof and having the following layers on said roughened surface:
   (a) an undercoating of transparent, organic based paint,
   (b) a metal coating on said undercoating and
   (c) a transparent protective coating on said metal coating, and
(2) an information visualizing means, including an image, provided behind the rear surface of said plate, said visualizing means and said plate with said undercoating, metal coating and protective coating thereon adapted to make a display from said visualizing means appear on the surface of said protective coating by light emitted from or through said visualizing means and passing through said plate from back to front, said plate with said undercoating, metal coating and protective coating thereon substantially preventing light, the intensity of which is less than said light emitted from or through said visualizing means, from passing through said plate and said undercoating, metal coating and protective coating thereon.

6. The information display device according to claim 5 wherein the thickness of the metal coating is 200–300 Å and the protective coating contains a flatting agent.

7. An information display device comprising:
 (1) a plate made of a transparent material and having a roughened surface with convex portions of 25 microns or less on the rear surface thereof and having the following layers on said roughened surface:
  (a) an undercoating of transparent, organic based paint,
  (b) a metal coating on said undercoating and
  (c) a transparent protective coating on said metal coating, and
 (2) an information visualizing means, including an image, provided behind said protective coating, said visualizing means and said plate with said undercoating, metal coating and protective coating thereon adapted to make a display from said visualizing means appear on the front surface of said plate by light emitted from or through said visualizing means and passing through said plate from back to front, said plate with said undercoating, metal coating and protective coating thereon substantially preventing light, the intensity of which is less than said light emitted from or through said visualizing means, from passing through said plate.

8. The information display device according to claim 7 wherein the thickness of the metal coating is 200–300 Å, and the undercoating contains a flatting agent.

* * * * *